(No Model.)

J. C. TELFER.
PIPE COUPLING.

No. 254,850. Patented Mar. 14, 1882.

WITNESSES

Jno. C. Telfer  INVENTOR
By Liggett & Liggett

ATTORNEYS

UNITED STATES PATENT OFFICE.

JOHN C. TELFER, OF CLEVELAND, OHIO.

PIPE-COUPLING.

SPECIFICATION forming part of Letters Patent No. 254,850, dated March 14, 1882.

Application filed July 11, 1881. (No model.)

*To all whom it may concern:*

Be it known that I, JOHN COPPELL TELFER, of Cleveland, in the county of Cuyahoga and State of Ohio, have invented certain new and useful Improvements in Pipe-Couplings; and I do hereby declare the following to be a full, clear, and exact description of the invention, such as will enable others skilled in the art to which it pertains to make and use it, reference being had to the accompanying drawings, which form part of this specification.

My invention relates to pipe-couplings; and it consists, as an article of manufacture, of a cylindrical washer having an annular flange upon its end, adapted to cover the end of a pipe.

Figure 1:
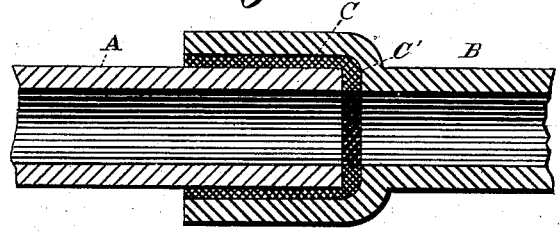
Figure 2:
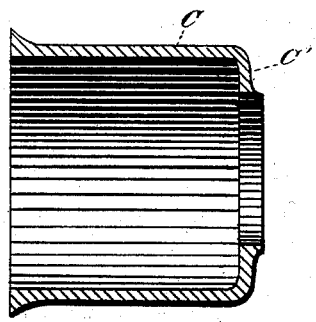
Figure 3:
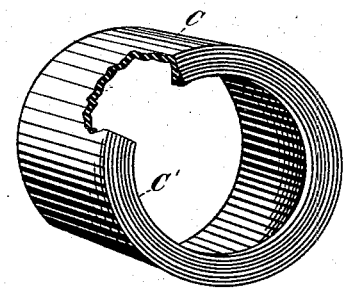

In the drawings, Figure 1 is a vertical sectional view of pipes coupled by my invention. Fig. 2 is a sectional view of the washer. Fig. 3 is an isometric view, with a part broken away to show its annular flange.

This washer is especially adapted for use in coupling sewer-pipe of the ordinary earthenware type, and when used for this purpose I prefer to construct it of tarred paper, which, from the nature of the elements of which it is made, is calculated to resist the action of water or any of the elements that are calculated to destroy washers made of other material.

In the drawings, A represents the male end of one pipe, adapted to enter the female end of the pipe B.

C represents that portion of a washer adapted to cover the outer portion of the pipe.

C' represents the flange or annular portion, adapted to cover the end of the pipe A. A washer made in this form thoroughly closes the pipe-joints, can be easily applied, and is inexpensive.

I prefer to construct these washers of different sizes, and place them upon the market as an article of manufacture for sale.

I am aware that pipe-sections have been connected by bolts, and a narrow sleeve or ring has been located at the joint, said sleeve snugly fitting the adjacent ends of the pipe-sections, and provided with an annular flange that fits between the ends of the pipe, and hence I would have it understood that I make no claim to such construction of parts. My improved coupling or washer is cylindrical in form, and provided at one end with an inwardly-projecting flange, which snugly fits against the end of one pipe-section, while the cylindrical portion receives the end of the same pipe-section. When the pipe, with this washer or coupling attached thereto, is inserted in the enlarged end of the adjacent pipe-section, the joint will be made perfectly tight.

What I claim is—

1. A washer or pipe-coupling consisting of a cylindrical portion having an inwardly-projecting flange adapted to fit upon the end of a pipe-section, said cylindrical portion adapted to receive the end of the same pipe-section, substantially as set forth.

2. As an article of manufacture, a washer or pipe-coupling made of tarred paper, consisting of a cylindrical portion and an inwardly-projecting flange formed on one end thereof, substantially as set forth.

3. The combination, with two pipe-sections, one having an enlarged end adapted to receive the adjacent end of the next pipe-section, of a washer or coupling having a cylindrical body adapted to snugly fit between the adjacent cylindrical surfaces of the pipe-sections, and provided with an inwardly-projecting flange adapted to fit between the end of one section and a shoulder on the other section, substantially as set forth.

In testimony whereof I have signed my name to this specification in the presence of two subscribing witnesses.

JOHN C. TELFER.

Witnesses:
 JNO. CROWELL, Jr.,
 ALBERT E. LYNCH.